US012612186B2

(12) United States Patent
Dobbin

(10) Patent No.: US 12,612,186 B2
(45) Date of Patent: Apr. 28, 2026

(54) ASSEMBLY OF AIRCRAFT WINGS

(71) Applicant: Airbus Operations Limited, Bristol (GB)

(72) Inventor: Richard Dobbin, Bristol (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 19/050,619

(22) Filed: Feb. 11, 2025

(65) Prior Publication Data

US 2025/0263178 A1 Aug. 21, 2025

(30) Foreign Application Priority Data

Feb. 15, 2024 (GB) ...................................... 2402116

(51) Int. Cl.
B64F 5/10 (2017.01)
B64C 3/26 (2006.01)
(52) U.S. Cl.
CPC . B64F 5/10 (2017.01); B64C 3/26 (2013.01)
(58) Field of Classification Search
CPC ..... B64F 5/10; B64C 3/26; B64C 3/18; B64C 3/34; B64D 37/32; B64D 45/02
See application file for complete search history.

(56) References Cited

U.S. PATENT DOCUMENTS 11,254,443 B2 2/2022 Dobbin
12,060,161 B2 8/2024 Dobbin
12,060,162 B2 8/2024 Dobbin
2012/0236457 A1* 9/2012 Yamakoshi ............ B64D 45/02
29/525.01
2019/0106195 A1 4/2019 Wilkerson
2022/0136551 A1 5/2022 Dobbin et al.
(Continued)

FOREIGN PATENT DOCUMENTS

EP 3287362 B1 7/2021
EP 3992479 B1 5/2022
(Continued)

OTHER PUBLICATIONS

United Kingdom Search Report for corresponding United Kingdom Patent Application No. 2402116.4 dated Jul. 26, 2024.
(Continued)

*Primary Examiner* — Lawrence Averick
(74) *Attorney, Agent, or Firm* — Greer, Burns & Crain, Ltd.

(57) ABSTRACT

A method of joining a wing skin to a structural element of an aircraft wing. A locating through hole is formed in the structural element, extending along a path between a first side of the structural element and a second side of the structural element. A spark containment cap is attached to the first side of the structural element to covering an opening of the locating through hole. A portion of the wing skin is positioned on the second side of the structural element. A fastening through hole having a larger diameter than the locating through hole is formed through both the wing skin and the structural element and along the path of the locating through hole. A fastener is inserted into the fastening through hole and the structural element secured to the wing skin, an end of the fastener being covered by the spark containment cap.

13 Claims, 3 Drawing Sheets

(56)　　　　　　References Cited

U.S. PATENT DOCUMENTS

2022/0389951　A1　　12/2022　Block et al.
2023/0002073　A1 *　　1/2023　Dobbin ................. B64D 45/02

FOREIGN PATENT DOCUMENTS

EP　　　　4112479　A1　　　1/2023
EP　　　　3894323　B1　　　8/2023
GB　　　　2568890　A　　　6/2019
GB　　　　2584433　A　　12/2020
GB　　　　2608394　A　　　1/2023
GB　　　　2629571　A　　11/2024

OTHER PUBLICATIONS

European Search Report for corresponding European Patent Appli-
cation No. 25151442.8 dated May 26, 2025.

* cited by examiner

ASSEMBLY OF AIRCRAFT WINGS

CROSS-REFERENCES TO RELATED APPLICATIONS

This application claims the benefit of Great Britain Patent Application Number 2402116.4 filed on Feb. 15, 2024, the entire disclosure of which is incorporated herein by way of reference.

FIELD OF THE INVENTION

The present invention relates to aircraft wings, and more specifically to methods for assembling aircraft wings.

BACKGROUND OF THE INVENTION

In the assembly of aircraft wings, fasteners are installed to attach the wing skin to structural elements of the wing, such as ribs and spars.

Some wing designs prevent access to the inside of the wing structure during assembly of the wing and therefore require installation to occur predominantly from outside of the wing structure, known as a "single-sided" assembly. In such assembly approaches, the wing skin can be removed after being drilled to clean up swarf or de-burr the drilled holes before being reattached and fastened to the structural element of the wing. However, these additional steps can increase production time of the wing. Some assembly approaches are known as a "one-way" assemblies, in which the wing skin is not removed once fastened to the structural element, so that subsequent clean-up or de-burring steps are not performed to thereby reduce production time. If both single-sided and one-way assembly techniques are employed then all installation steps can be performed from the outside of the wing structure, and without subsequent steps. However, in such an approach, it is essential to use fasteners which can be installed and fastened from one side, known as blind fasteners.

It is also known that fasteners in aircraft wings generally require additional sealing, for example by provision of a spark containment cap applied to the structural element of the wing to cover an inside portion of the fastener, in order to provide lightning strike protection, fuel tightness, and corrosion resistance. In particular, fuel tank fasteners require safety compliant protection to isolate potential ignition sources, such as a lightning strike event, from the fuel tank. However, in the context of single-sided assembly, where caps are applied to the structural elements of the wing prior to drilling, this additional sealing requires accurate positioning of both the spark containment cap and the through hole which receives the fastener to ensure "break-out" of the hole inside the spark containment cap and such that a tail side of the fastener, when the fastener is inserted through the fastener through-hole, is arranged within the containment cap. Furthermore, such protective components may not be adjustable after the fastener is installed due to the single-sided approach.

It is desirable, therefore, to provide an improved method for assembling aircraft wings which allows for accurate, single-sided installation of blind fasteners with necessary spark containment caps, whilst also allowing reducing production time.

SUMMARY OF THE INVENTION

A first aspect of the present invention provides a method for joining a wing skin to a structural element of an aircraft wing. The method comprises: forming a locating through hole in the structural element, the locating through hole extending along a path between a first side of the structural element and a second side of the structural element; attaching a spark containment cap to the first side of the structural element, the spark containment cap covering an opening of the locating through hole; positioning a portion of the wing skin on the second side of the structural element; forming a fastening through hole, having a larger diameter than the locating through hole, through both the wing skin and the structural element and along the path of the locating through hole, such that the fastening through hole comprises: a first opening in the wing skin, and a second opening in the structural element and covered by the spark containment cap; and inserting a fastener into the fastening through hole and securing the structural element to the wing skin, an end of the fastener being covered by the spark containment cap.

The method facilitates the accurate single-sided installation of a fastener in order to secure a wing skin to a structural element of a wing, wherein the fastener is covered by a spark containment cap such that the fastener is safety compliant. The method does not require further stages such as cleaning-up or deburring of the fastener through-hole, and so the installation procedure can be relatively quick compared with two-sided installations or installation procedures in which the wing skin is subsequently removed after drilling.

A "locating through hole", as described herein, refers to an initial through hole which indicates a location for attachment of a spark containment cap. During the assembly method, the locating through hole is anticipated to be removed, or effectively widened, during the formation of the subsequent fastening through hole. A "fastening through hole", as described herein, refers to a through hole which is dimensioned such that a blind fastener can be received within the through hole and can engage with surfaces proximal to the through hole in order to fasten said surfaces together.

"Forming" a through hole, as used herein, refers to any process used to form a through hole, such as drilling and/or cutting, for example. The fastening through hole being formed "along" the path of the locating through hole, as referred to herein, means that that the fastening through hole is formed in substantially the same place as, and in the same general direction as, the locating through hole. The fastening through hole does not necessarily have to be exactly parallel to the locating through hole; the skilled person will appreciate that there can be variation in their relative angles through the structural element, but nevertheless the fastening through hole can have a first opening in the wing skin and a second opening within the spark containment cap. For example, the fastening through hole may be aligned within 45 degrees of the locating through hole, or within 20 degrees, or within 5 degrees, or within 1 degree, for example, depending on diameter of the fastening through hole relative to the locating through hole, the thickness of the structural element, and the internal diameter of the spark containment cap, for example. The fastening through hole can therefore be thought of as being formed at least partially through the locating through hole, in that the fastening through hole at least partially, and in some examples entirely, overlaps the locating through hole. In some examples, the locating through hole is positioned centrally relative to the subsequently formed fastening through hole, and the fastening through hole is formed substantially parallel to the locating through hole to thereby entirely overlap the locating through hole.

A spark containment cap is a cap having a body with an internal cavity which typically forms a sealed cavity around an end of the fastener protruding from a structure. A volume of gas enclosed by the cavity can provide spark suppression, and containment of sparking and plasma outgassing that may occur between the structure and the metal fastener during, for example, a lightning strike event. In examples, components of the spark containment cap are formed from additional insulative materials to contribute to the aforementioned spark suppression. A spark containment cap may alternatively be known as a lightning strike protection cap, for example.

In forming the locating through hole in the structural element, the spark containment cap can be positioned accurately on the structural element by using the locating through hole as a guide marker, for example. This can reduce uncertainty in the position of the spark containment cap which can be beneficial when installing blind fasteners. The locating through hole can be formed during machining of the structural element, and so can be formed with very high accuracy relative to an intended position.

Since the locating through hole is in a known position relative to the structure, the spark containment cap can be positioned accurately with respect to the structure and hence the fastening through hole can be formed accurately with respect to the spark containment cap. The fastening through hole can "clean-up" the locating through hole. As used herein, to "clean-up" the locating through hole means to drill through and along, or sufficiently close to, the path of the locating through hole, removing surfaces which formed the boundaries of the locating through hole, thereby removing the locating through hole. In that sense, the locating through hole can be understood to have been replaced by, or expanded to form, the fastening through hole.

In positioning the spark containment cap to cover the opening of the locating through hole and subsequently the opening of the fastening through hole, the fastener is thereby, when inserted into the fastening through hole, covered by the spark containment cap on the structure side. In other words, a tail end of the fastener, a portion of the fastener emerging from the second opening of the fastening through hole, is covered by the spark containment cap. This can allow the fastener to be safety compliant and used within or in the proximity of fuel tanks, for example. Additionally, the spark containment cap can also contain and assist in the extraction of swarf produced in forming the fastening through hole and prevent the swarf from being deposited to other parts of the wing interior. This can be contrasted from methods which form a fastening through hole prior to attaching a spark containment cap, wherein a greater quantity of swarf is likely to be formed whilst drilling and may require a more rigorous or time-consuming cleaning process to remove, since there is no cap to contain the swarf.

Additionally, in forming the locating through hole prior to forming the fastening through hole, a quantity of material from the structural element is removed during formation of the locating through hole. This can reduce a quantity of material produced as swarf during formation of the fastening through hole, further improving the installation procedure. The presence of the locating through hole can also reduce the difficulty in forming the fastening through hole, for example by reducing the load placed on the machining tools whilst forming the fastening through hole.

In particular, the method can be contrasted from assembly methods in which the wing skin and the structural element are both drilled with through holes prior to assembly. For instance, in some known assembly methods, during a preassembly stage the structural element and wing skin are both pre-drilled with a common through hole formed from a single drilling action. This through hole is later used for insertion of a fastener to attach the structural element to the wing skin. Subsequently the structural element and the wing skin are separated so that a spark containment can be affixed to the structural element, for example. However, there is a risk that when the structural element and wing skin are brought back together to be fastened together during assembly of the wing, the through holes have become subsequently misaligned due to, for example, the structural element undergoing a slight variation in shape when attached to the rest of the wing structure. However, in the present invention, the wing cover is only drilled at the point of fastening to the structural element, which can negate or otherwise reduce a risk of the through holes being misaligned. Furthermore, and in any case, the overall time of assembly can be reduced because the wing skin may only need to be aligned with the structural element once, rather than twice.

Optionally, attaching the spark containment cap comprises providing a temporary fastener within the locating through hole. The temporary fastener is configured to secure the spark containment cap to the structural element. In this way, the spark containment cap can be accurately aligned using the locating through hole as a guide, and also held into position during attachment of the spark containment cap to the structural element. This can improve the accuracy of installation of the spark containment cap. For example, application of adhesive can dislodge or otherwise reposition the spark containment cap during attachment to the structural element. The temporary fastener can resist or prevent this movement to facilitate the spark containment cap being attached to the intended position. Additionally, the temporary fastener can impart a force onto the spark containment cap to aid in attaching the spark containment cap to the structural element. For example, the temporary fastener can impart a force onto the spark containment cap which acts to press the spark containment cap against the structural element and thereby improve the strength of an adhesive bond between the spark containment cap and the structural element. This force can also resist lifting forces which might be imparted by injection of adhesive into the cap. The temporary fastener may also be known as a locating tool.

Optionally, the temporary fastener is threaded, and the spark containment cap comprises a corresponding threaded receiving portion configured to receive a threaded portion of the temporary fastener. In this way, the temporary fastener can be straightforwardly installed and subsequently uninstalled by threading and unthreading, for example once the spark containment cap is attached to the structural element.

Optionally, the temporary fastener is an expandable temporary fastener and the spark containment cap comprises a surface arranged such that, when the temporary fastener is inserted into the spark containment cap, the temporary fastener expands and engages with the surface to resist removal from the spark containment cap. Such an expandable temporary fastener may be known as a Cleco, or Cleko, fastener. Generally, such a fastener comprises flexible flange portions, or some other expanding portion, which contract when inserted through the locating through hole, but splay once through to produce an oversized cross-section relative to the locating through hole, and thereby resist removal from the locating through hole. In this way, the temporary fastener can be quickly installed which can improve the speed of production of the wing, for example.

Optionally, the spark containment cap comprises a washer within the internal cavity.

Optionally, the washer is formed of an electrically insulative material. This can further improve the performance of the spark containment cap in preventing or reducing a flow of electrical current which can otherwise present an ignition risk, for example. This can further improve the spark suppression effect of the spark containment cap.

Optionally, the surface with which the temporary fastener engages is the washer. The temporary fastener can be threaded through an aperture of the washer, and engage with a face of the washer, for example.

Optionally, the spark containment cap comprises a portion configured to receive adhesive for attaching the spark containment cap to the structural element, and wherein attaching the spark containment cap to the first side of the structural element comprises providing and curing the adhesive. In using adhesive, a number of physical modifications to the structural element or spark containment cap can be reduced, for example by removing or reducing the need for drilling of additional holes and provision of additional fasteners in order to attach the spark containment cap to the structural element. This can further reduce time taken or a number of stages required to perform installation of the spark containment cap. The spark containment cap, in comprising a portion configured to receive adhesive, can thereby limit the spread of adhesive within the aircraft interior, as well as within the interior of the cap, which can provide a cleaner installation, for example.

Optionally, the portion is a skirt disposed along a perimeter of the spark containment cap base, the skirt configured such that adhesive provided to the skirt may be confined within the skirt and does not ingress into the interior of the cap, which may compromise performance of the cap in resisting against a lightning strike.

Optionally, a diameter of the locating through hole is less than half of a diameter of the fastening through hole. A temporary fastener of less than half of the internal diameter of the spark containment cap may be used. By reducing the size of the locating through hole relative to the fastening through hole, misalignment of the formation of the fastening through hole is more likely to "clean-up" the locating through hole by entirely overlapping the locating through hole.

Optionally, the diameter of the locating through hole is less than a quarter of the diameter of the fastening through hole. A temporary fastener of less than half of the internal diameter of the spark containment cap may be used.

Optionally, a diameter of the fastening through hole is more than three quarters of an internal diameter of the spark containment cap. In other words, the spark containment cap may have a size which is sufficiently large enough to accommodate the fastener, but no larger to reduce an overall size of the spark containment cap. This can reduce a weight of the aircraft wing, for example, especially when scaled up to many spark containment caps.

In examples, the diameter of the locating through hole is one of 2 mm, 2.4 mm, 2.8 mm, or 3.2 mm. In examples utilizing a fractional inch drill bit system, the diameter of the locating through hole is one of 5/64 inch, 3/32 inch, 7/64 inch, or 1/8 inch. Similarly, temporary fasteners of substantially the same size may be used. In an example, a fastener having a 1/4 inch diameter is used. In a particular example, a locating through hole having a diameter of 3/32 inch and a fastening through hole having a diameter of 1/4 inch is used.

Optionally, the structural element is a rib or a spar of the aircraft wing.

Optionally, the structural element forms a portion of a fuel tank and the spark containment cap is provided within the fuel tank.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
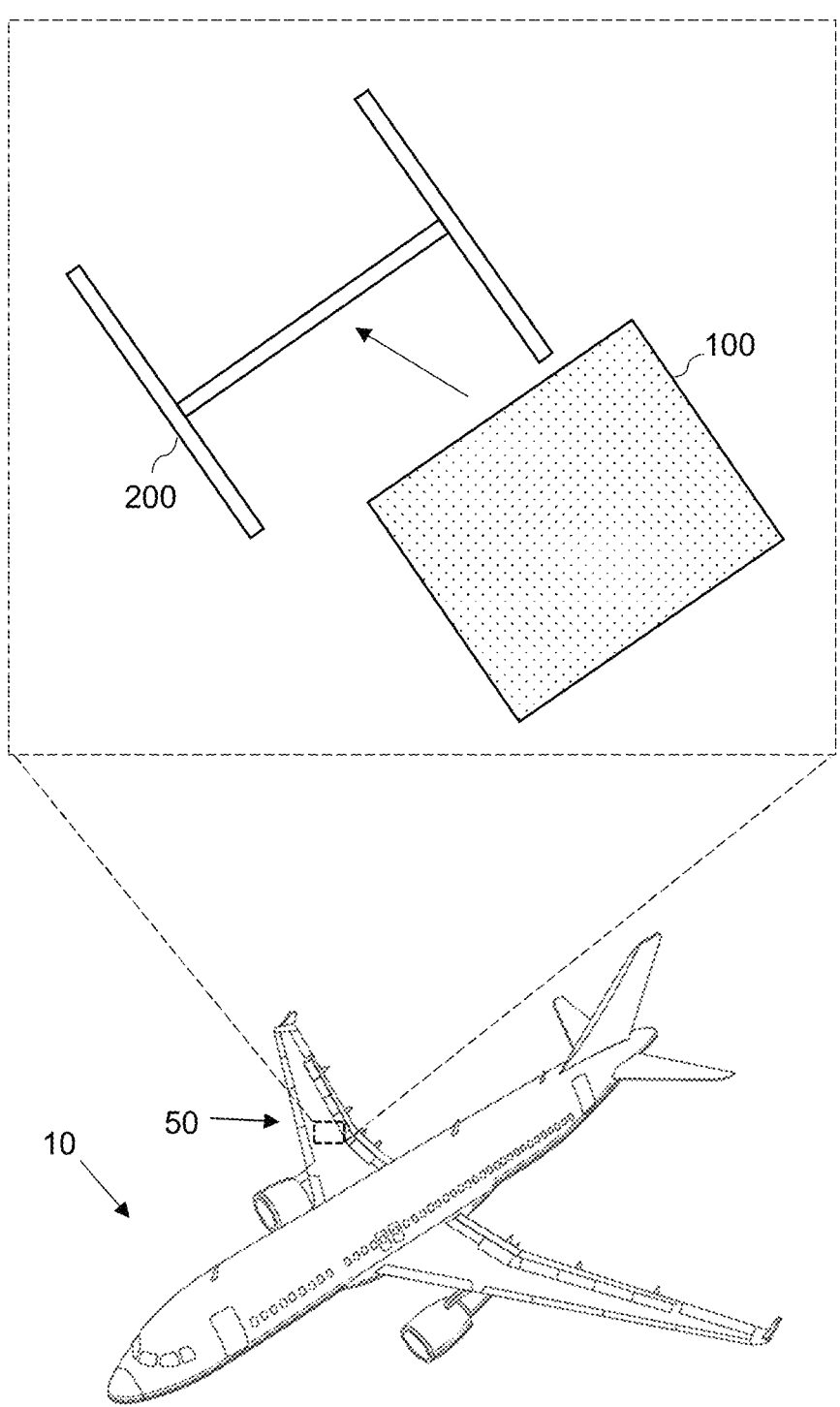
FIG. 1 shows a schematic view of a wing skin being attached to a structural element of an aircraft wing according to an example.

FIG. 1 schematically illustrates the assembly of a wing structure 50 of an aircraft 10. A wing skin 100, alternatively known as a wing cover, is attached to a structural element 200 of the wing, such as a rib or a spar. In general the structural element 200 defines an overall shape of the aircraft wing 50 and supports the wing skin 100 such that the wing skin 100 remains smooth and produces suitable aerodynamic forces required for flight. Attachment of the wing skin 100 to the structural element 200 requires the wing skin 100 and structural element 200 to be drilled such that a fastener can attach the two together.

FIGS. 2a-e schematically illustrate a method for attaching the wing skin 100 to the structural element 200 according to an embodiment. Each figure is a cross-sectional view illustrating the structural element 200 at various stages of the method.

Figures 2A, 2B, 2C, 2D, 2E:
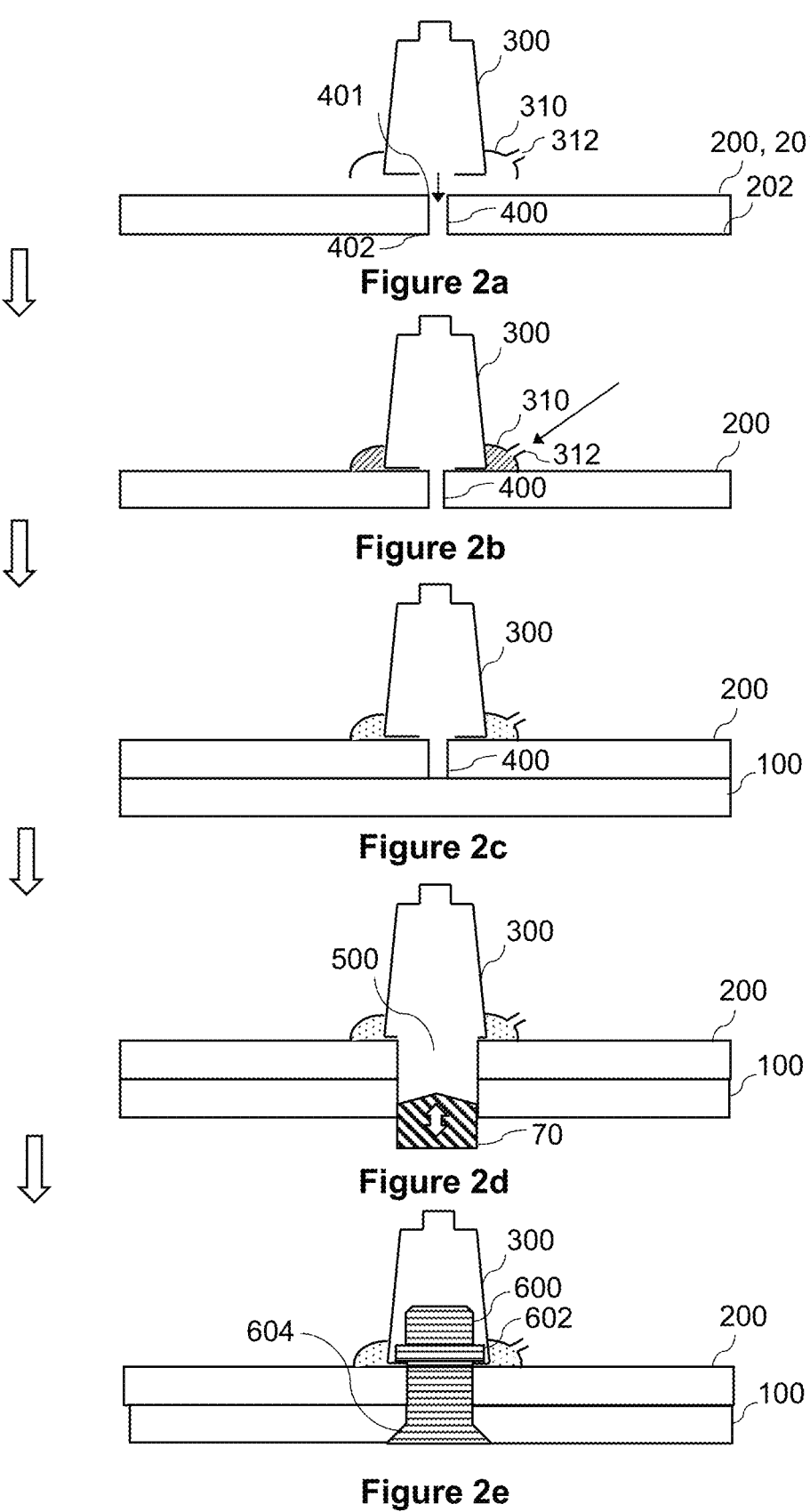
FIG. 2a shows a schematic view of a first step of a method for attaching the wing skin to the structural element of an aircraft wing according to an example.
FIG. 2b shows a schematic view of a second step of a method for attaching the wing skin to the structural element of an aircraft wing according to an example.
FIG. 2c shows a schematic view of a third step of a method for attaching the wing skin to the structural element of an aircraft wing according to an example.
FIG. 2d shows a schematic view of a fourth step of a method for attaching the wing skin to the structural element of an aircraft wing according to an example.
FIG. 2e shows a schematic view of a fifth step of a method for attaching the wing skin to the structural element of an aircraft wing according to an example.

In FIG. 2a, a locating through hole 400 has been drilled through the structural element 200. The locating through hole 400 is formed through the structural element such that a first opening 401 of the locating through hole 400 is on a first side 201 of the structural element 200, and a second opening 402 of the locating through hole 400 is on a second side 202 of the structural element 200, the first side 201 of the structural element 200 opposite the second side 202 of the structural element 200. In the assembled wing, the first side 201 of the structural element 200 is an interior surface of the aircraft wing 50, whereas the second side 202 of the structural element 200 is towards the exterior of the aircraft wing 50, relative to the first side 201.

The locating through hole 400 is, in this example, formed by a 2.4 mm drill bit, or a ³⁄₃₂ inch drill bit. The locating through hole 400 can be formed during the machining of the structural element 200 which can allow for a high degree of accuracy, such as within 0.1 mm of an intended, or target, location. Relative to a fastening hole formed later in FIG. 2*d*, the locating through hole 400 has a narrow diameter.

Additionally, a spark containment cap 300 may be positioned to cover an opening of the locating through hole 400, as indicated in FIG. 2*a*. The spark containment cap 300 can be positioned using the locating through hole 400 as a guide. The spark containment cap 300 comprises a body with an internal cavity. Around a perimeter of the body is a skirt 310 which has an inlet 312 for delivery of adhesive to the skirt 310.

In FIG. 2*b*, the spark containment cap 300 has been affixed, or attached, to the structural element 200. In this example, to affix the spark containment cap 300, the skirt 310 of the spark containment cap 300 is filled with adhesive via the inlet 312 and cured in order to attach the spark containment cap 300 to the structural element 200. The adhesive can be a polysulphide sealant or a polythioether sealant, for example. The adhesive can also act to seal the interior of the spark containment cap 300 from the interior of the aircraft wing 50 surrounding the spark containment cap 300. This is one example of a way in which the spark containment cap 300 can be attached to the structural element 200. In some examples, the spark containment cap 300 comes with adhesive already provided within the cap 300, and an operator is only required to initiate a curing process of the adhesive, for example. In other examples, affixing the spark containment cap 300 to the structural element 200 can include providing additional mechanical fasteners, or an integrated fastener formed within and distributed between the structural element 200 and the spark containment cap 300 which allows for their attachment.

In FIG. 2*c*, the wing skin 100 is positioned on the second side 202 of the structural element 200 and covers the locating through hole 400. In other words, the structural element 200 is between the wing skin 100 and the spark containment cap 300. The second opening 402 of the locating through hole 400 can be used as a visual guide to assist in correctly positioning the wing skin 100 relative to the structural element 200 and spark containment cap 300.

In FIG. 2*d*, a fastening through hole 500 is formed. The fastening through hole 500 is for receiving a fastener 600 which will fasten the wing skin 100 to the structural element 200. The fastening through hole 500 is formed by drilling, using a drill 70, from the wing skin 100 through the structural element 200, along the path of the locating through hole 400. The fastening through hole 500, in following the path of the locating through hole 400, thereby opens into the interior of the spark containment cap 300. The fastening through hole 400 has a larger diameter than the locating through hole 400, generally matched to a diameter of the fastener 600 to be inserted through the fastening through hole 500. For example, the fastener 600 may be a ¼ inch (6.35 mm) diameter fastener, and the fastening through hole 500 of an equivalent diameter. Forming the fastening through hole 500 along the path of the locating through hole 400 effectively expands the locating through hole 400, or in another sense removes the locating through hole 400 by replacing it with the larger fastening through hole 500.

Following formation of the fastening through hole 500 and removal of the drill 70, swarf can be cleaned out of the fastening through hole 500.

In FIG. 2*e*, a fastener 600 is inserted into the fastening through hole 500. The wing skin 100 is fastened, or secured, to the structural element 200 by the fastener 600.

The fastener 600 is a blind fastener, and can be tightened from the wing skin side, the exterior of the aircraft, and does not require access to the interior of the aircraft to tighten. The fastener 600 may be a blind rivet or blind bolt, for example. The blind fastener 600 can function by, for example, rotation of an internal threaded portion which forms a bulbed nose portion 602 on the tail end of the fastener 600, that is the wing structure side 200 of the fastener 600; the wing structure 200 and wing skin 100 are clamped between the bulbed nose portion 602 and a head portion 604, which is on the wing skin side of the fastener, to thereby fasten the wing structure 200 to the wing skin 100. The blind fastener 600 may comprise a frangible portion which is operable to rotate the blind fastener during fastening, but can be removed once installed, for example.

Depending on the precise design of the fastener 600, fastening the wing skin 100 to the structural element 200 may occur, or at least partially occur, as part of insertion of the fastener 600 into the fastening through hole 500—for example, the fastener 600 may be threaded and so insertion of the fastener 600 into the fastening through hole 500 may involve rotation of the fastener 600 which also acts to at least partially secure the structural element 200 to the wing skin 100, for example. In other examples, the fastener 600 may be fully inserted into the fastening through hole 500 before fastening the wing skin 100 to the structural element 200. An end of the fastener 600 on the structural element 200 side is contained within the spark containment cap 300, thereby protecting the interior of the aircraft wing 50 from spark risks, for example.

Figure 3:
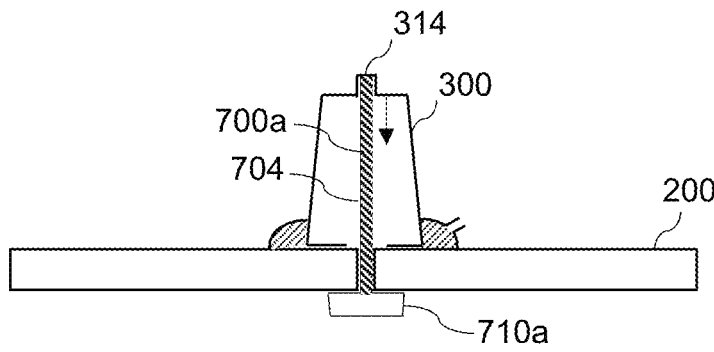
FIG. 3 shows a schematic view of a temporary fastener, according to a first example, for use in the method of FIGS. 2a-2e.
Figure 4:
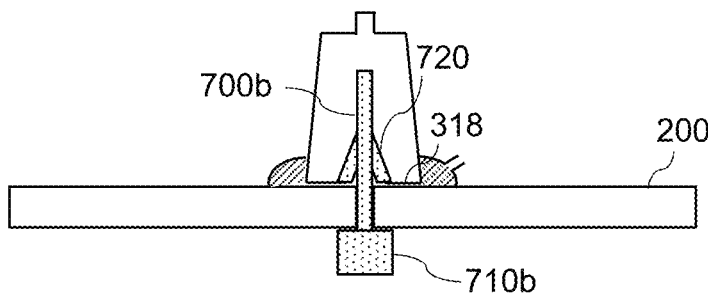
FIG. 4 shows a schematic view of a temporary fastener, according to a second example, for use in the method of FIGS. 2a-2e; and, FIG. 5 shows a schematic view of the formation of a fastening through hole, according to an example.

FIGS. 3 and 4 illustrate steps which may be performed in some examples of the method. A temporary fastener 700*a*, 700*b* is inserted through the locating through hole 400 and used to temporarily secure the spark containment cap 300 to the structural element 200 prior to adhesive or other fastening means permanently securing the spark containment cap 300 to the structural element 200.

In the example of FIG. 3, a threaded temporary fastener 700*a* is illustrated. The threaded temporary fastener 700*a* has a head 710*a* and a threaded body 704. The spark containment cap 300 has a threaded receiving portion 314 at a distal end of the spark containment cap 300, furthest from the opening of the locating through hole 400 and structural element 200. An internal diameter of the threaded receiving portion 314 matches the diameter of the threaded body 704 of the threaded temporary fastener 700*a*. The threaded temporary fastener 700*a* has a sufficient length that, upon being inserted into the locating through hole 400, the threaded body 704 can be received by the threaded receiving portion 314 of the spark containment cap 300. The threaded body 704 of the threaded temporary fastener 700*a*, in conjunction with the head 710*a* of the threaded temporary fastener 700*a*, is able to impart force onto the spark containment cap 300 to force it into stronger contact with the structural element 200. This can aid adherence of the structural element 200 to the spark containment cap 300, and prevent misalignment of the spark containment cap 300 due to accidental movement, for example.

In the example of FIG. 4, an expandable temporary fastener 700*b* is used, such as a Cleco fastener. This performs a similar role to the threaded temporary fastener 700*a* of FIG. 3. The expandable temporary fastener 700b comprises a splayed flange portion 720 which can be expanded and contracted, allowing insertion through the locating through hole 400 when contracted but preventing or resisting removal back through the locating through hole 400 when expanded. A head 710b of the snap lock pin-type temporary fastener 700b can facilitate removal of the temporary fastener once the spark containment cap 300 is permanently affixed to the structural element 200 by adhesives or similar. Removal of the temporary fastener 700b may involve shearing off the splayed flange portion 720, for example.

In the example of FIG. 4, a washer 318 is provided within the spark containment cap 300 for the splayed flange portion 720 to engage with, in this example the washer 318 positioned next to the base of the spark containment cap 300, although in other examples the role of the washer 318 may be facilitated by another surface of the spark containment cap 300 such as the splayed flange portion 720 engaging directly with a portion of the base of the spark containment cap 300. More generally, it will be appreciated that the surface is positioned such that it engages with the temporary fastener 700b when the temporary fastener is pulled out of the through hole. The washer 318 may be formed from an electrically insulative material to improve the anti-spark properties of the spark containment cap 300. The washer 318 may have a metal core, for example, with an insulative, or dielectric, coating such as a ceramic or a paint.

Figure 5:
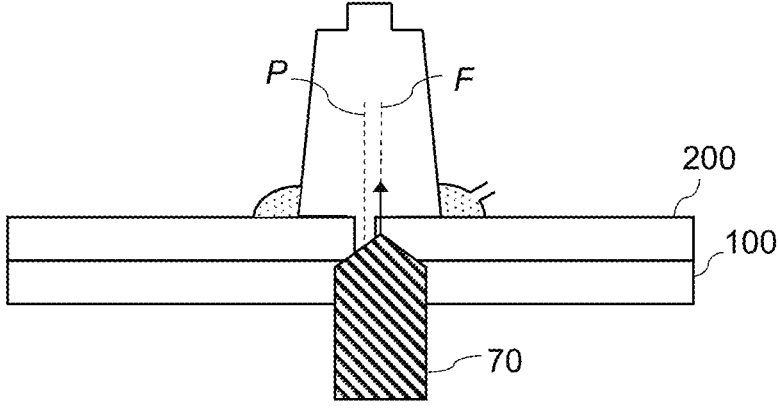

The fastening through hole 500 is typically positioned by datums provided on the wing skin and wing jig with the intention of aligning the locating through hole 400 with the fastening through hole 500, but offset may be introduced between the locating through hole 400 and the fastening through hole 500 during manufacture. FIG. 5 illustrates schematically a scenario in which, due to the blind nature of the installation process, the drill 70 and hence formation of the fastening through hole 500, aligned along indicative axis F, is misaligned with the position of the locating through hole 400, which is aligned along indicative axis P. However, due to the smaller diameter of the locating through hole 400 than the fastening through hole 500, the fastening through hole 500 is still able to entirely overlap with and hence remove the locating through hole 400. In this sense, minimizing the size of the locating through hole 400 can allow for both provision of temporary fastener 700 to temporarily secure the spark containment cap 300 to the structural element 200, but also be removed easily during formation of the fastening through hole 500. If a larger through hole is used in place of the locating through hole 400, there is a risk that the diameter of the fastening through hole 500 does not entirely overlap the diameter of the locating through hole 400 which could result in a non-circular hole being formed. The fastener 600 provided in such a non-circular hole may be rendered insecure, for example.

The skilled person will be familiar with the use of standard metric drill bit sizes and fractional inch drill bit sizes, both of which are commonly used, as well as any other particular system of drill bit sizes. Examples described herein may utilize 2 mm, 2.4 mm, 2.8 mm, or 3.2 mm drill bits, for example in formation of the locating through holes, which the skilled person will understand to relate in a fractional inch drill bit system approximately correspond respectively to $5\!/\!64$ inch, $3\!/\!32$ inch, $7\!/\!64$ inch, or $1\!/\!8$ inch drill bits. These sizes are merely provided as examples, and the skilled person will appreciate that other diameters may be used.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of joining a wing skin to a structural element of an aircraft wing, the method comprising:
   forming a locating through hole in the structural element, the locating through hole extending along a path between a first side of the structural element and a second side of the structural element;
   attaching a spark containment cap to the first side of the structural element, the spark containment cap covering an opening of the locating through hole;
   positioning a portion of the wing skin on the second side of the structural element;
   forming a fastening through hole, having a diameter larger than the locating through hole, through both the wing skin and the structural element and along the path of the locating through hole, such that the fastening through hole comprises:
      a first opening in the wing skin, and
      a second opening in the structural element and covered by the spark containment cap; and
   inserting a fastener into the fastening through hole and securing the structural element to the wing skin, an end of the fastener being covered by the spark containment cap,
   wherein attaching the spark containment cap comprises providing a temporary fastener within the locating through hole prior to the forming the fastening through hole step, the temporary fastener configured to secure the spark containment cap to the structural element.

2. The method according to claim 1, wherein the spark containment cap comprises a washer.

3. The method according to claim 2, wherein the washer is formed of an electrically insulative material.

4. The method according to claim 2, wherein attaching the spark containment cap comprises providing a temporary fastener within the locating through hole, the temporary fastener configured to secure the spark containment cap to the structural element,
   wherein the temporary fastener is a snap lock pin fastener and the spark containment cap comprises a surface arranged such that, when the temporary fastener is inserted into the spark containment cap, the temporary fastener engages with the surface to resist removal from the spark containment cap, and,
   wherein the surface with which the temporary fastener engages is the washer.

5. The method according to claim 1, wherein the spark containment cap comprises a portion configured to receive adhesive for attaching the spark containment cap to the structural element, and wherein attaching the spark containment cap to the first side of the structural element comprises providing and curing the adhesive.

6. The method of claim 5, wherein the portion is a skirt disposed along a perimeter of the spark containment cap, the skirt configured such that adhesive provided to the skirt is confined within the skirt.

7. The method according to claim 1, wherein a diameter of the locating through hole is less than half of the diameter of the fastening through hole.

8. The method of claim 7, wherein the diameter of the locating through hole is less than a quarter of the diameter of the fastening through hole.

9. The method of claim 7, wherein a diameter of the fastening through hole is more than three quarters of an internal diameter of the spark containment cap.

10. The method of claim 1, wherein the structural element is a rib or a spar of the aircraft wing.

11. The method of claim 1, wherein the structural element forms a portion of a fuel tank and the spark containment cap is provided within the fuel tank.

12. A method of joining a wing skin to a structural element of an aircraft wing, the method comprising:

forming a locating through hole in the structural element, the locating through hole extending along a path between a first side of the structural element and a second side of the structural element;

attaching a spark containment cap to the first side of the structural element, the spark containment cap covering an opening of the locating through hole;

positioning a portion of the wing skin on the second side of the structural element;

forming a fastening through hole, having a diameter larger than the locating through hole, through both the wing skin and the structural element and along the path of the locating through hole, such that the fastening through hole comprises:

a first opening in the wing skin, and a second opening in the structural element and covered by the spark containment cap; and inserting a fastener into the fastening through hole and securing the structural element to the wing skin, an end of the fastener being covered by the spark containment cap, wherein attaching the spark containment cap comprises providing a temporary fastener within the locating through hole, the temporary fastener configured to secure the spark containment cap to the structural element, wherein the temporary fastener is threaded, and the spark containment cap comprises a corresponding threaded receiving portion configured to receive a threaded portion of the temporary fastener.

13. A method of joining a wing skin to a structural element of an aircraft wing, the method comprising:

forming a locating through hole in the structural element, the locating through hole extending along a path between a first side of the structural element and a second side of the structural element;

attaching a spark containment cap to the first side of the structural element, the spark containment cap covering an opening of the locating through hole;

positioning a portion of the wing skin on the second side of the structural element;

forming a fastening through hole, having a diameter larger than the locating through hole, through both the wing skin and the structural element and along the path of the locating through hole, such that the fastening through hole comprises:

a first opening in the wing skin, and a second opening in the structural element and covered by the spark containment cap; and inserting a fastener into the fastening through hole and securing the structural element to the wing skin, an end of the fastener being covered by the spark containment cap, wherein attaching the spark containment cap comprises providing a temporary fastener within the locating through hole, the temporary fastener configured to secure the spark containment cap to the structural element, wherein the temporary fastener is a snap lock pin fastener and the spark containment cap comprises a surface arranged such that, when the temporary fastener is inserted into the spark containment cap, the temporary fastener engages with the surface to resist removal from the spark containment cap.

* * * * *